United States Patent [19]
Muis et al.

[11] Patent Number: 5,495,793
[45] Date of Patent: Mar. 5, 1996

[54] METHOD AND APPARATUS FOR PREPARING A BEVERAGE

[75] Inventors: Jan A. Muis; Johannes H. Edelbroek, both of Odijk, Netherlands

[73] Assignee: Sara Lee/De N.V., Utrecht, Netherlands

[21] Appl. No.: 249,354

[22] Filed: May 27, 1994

[30]  Foreign Application Priority Data

May 27, 1993 [NL] Netherlands ............................ 9300913

[51] Int. Cl.⁶ ...................................................... A47J 31/34
[52] U.S. Cl. .................................. 99/280; 99/285; 99/287; 99/289 R
[58] Field of Search .............................. 99/289 R, 289 D, 99/289 P, 297, 280, 285, 287, 299, 300; 426/433

[56]  References Cited

U.S. PATENT DOCUMENTS

| 3,266,410 | 8/1966 | Novi | 99/289 R |
| 4,797,296 | 1/1989 | Meier | 99/289 R |
| 5,083,503 | 1/1992 | Hattem | 99/289 R |

FOREIGN PATENT DOCUMENTS

| 0056437 | 7/1982 | European Pat. Off. . |
| 0073739 | 3/1983 | European Pat. Off. . |
| 0237475 | 9/1987 | European Pat. Off. . |
| 0245197 | 11/1987 | European Pat. Off. . |
| 0452215 | 10/1991 | European Pat. Off. . |
| 0496242 | 7/1992 | European Pat. Off. . |
| 0521561 | 1/1993 | European Pat. Off. . |
| 3316157 | 11/1984 | Germany . |

OTHER PUBLICATIONS

Patent Abstract of Japan, vol. 017, No. 211 (C–1052) 26 Apr. 1993 & JP,A,04 352 915 8 Dec. 1992.

*Primary Examiner*—Robert W. Jenkins
*Attorney, Agent, or Firm*—Longacre & White

[57]  ABSTRACT

There is described an apparatus for preparing a beverage, in particular coffee, of the type wherein an electric motor drives a piston in a filling chamber. In accordance with the invention, the motor power is controlled with a closed loop control, so that the rotational speed can be held constant and the attainment of an end position of the piston can be detected from the increase of the motor power required, without requiring elements mounted on parts which are to be cleaned regularly.

Preferably, the apparatus is adapted to slightly press the coffee powder by means of the piston, and to slightly squeeze out the residual dregs, after the coffee-making process has ended, by means of the piston.

9 Claims, 4 Drawing Sheets

METHOD AND APPARATUS FOR PREPARING A BEVERAGE

The invention relates to an apparatus for preparing a beverage, comprising: at least one chamber for receiving a flavor-imparting substance, and a piston which is axially displacable relative to this at least one chamber; and at least one electromotor for driving the displacement of at least one apparatus part relative to the chamber, and means for detecting the position of this one apparatus part relative to the chamber.

Such an apparatus is known in practice, in embodiments suitable for making coffee and/or tea and/or drinking chocolate and/or soup or similar beverages. Via the displacable piston, water is supplied to the flavor-imparting substance, for instance coffee powder, and in course of time, the resulting beverage, in this case coffee, is discharged from the chamber. For the sake of convenience, only a coffee maker will be referred to hereinafter, but it is explicitly stated that the invention is not limited thereto.

An example of such coffee maker is disclosed in U.S. Pat. No. 5,083,503 (Van Hattem et al.) In this known coffee maker, two electromotors are present, a first electromotor being intended for driving the axial displacement of the piston relative to the chamber, and the second electromotor being intended for driving a displacement at right angles to the axial displacement.

Through energization of the first motor and by means of a transmission system, the piston is axially displaced in the chamber. When the piston has reached a predetermined position, the motor is switched off and the piston is held in that position, while the momentary position of the piston is detected by piston-coupled detectors. In particular, the displacement of the piston at that location is effected through rotation of a threaded cylinder provided around a housing part having a corresponding thread, which housing part is axially displaced due to this rotation of the cylinder, the piston position being derived from the position of the housing part as detected by a detector associated with this cylinder, such as a fixedly arranged Hall detector and magnets mounted on the cylinder.

Through energization of the second motor, when the piston has been withdrawn from the chamber, the chamber is tangentially displaced along a plurality of filling stations, allowing the chamber to be filled with a desired coffee powder. If the second motor is energized when the piston is located within the chamber, a closing plate is removed from the chamber to allow removal of coffee dregs, or, conversely, in the case of energization in the other direction, the closing plate is pressed into its position. For this displacement as well, position detectors are present to enable detection of the momentary position of the closing plate relative to the chamber and/or of the chamber relative to the filling stations.

Although this construction is in itself satisfactory, it still involves a number of drawbacks.

A first drawback is that the position detectors are relatively expensive and that they are relatively susceptible to troubles. In addition, it is a drawback that the detectors are directly coupled to housing parts whose removal, at given times, is desired for the purpose of a cleaning.

A second drawback is that during the coffee-making cycle, the motor(s) is (are) subjected to strongly varying counterforces, but that the energization supplied to the motor(s) (supply voltage) is of a constant nature. This involves that the parts of the transmission systems, which are moreover loaded relatively heavily, will not only be subject to varying loads, but they will also have varying rotational speeds and a varying noise production, which a user experiences as unpleasant.

A third drawback is that the known apparatus only allows detection of the positions of the parts with a relatively slight precision, while it is not at all possible to establish error conditions associated with the filling condition of the chamber. A first consequence thereof is that in the case where, due to any type of failure, no or too little coffee is contained in the chamber, the apparatus still continues making a beverage which, obviously, will not satisfy the user's expectations. Another consequence of the preceding is, among other things, that when the apparatus is adjusted, in respect of the above-mentioned predetermined piston position, tolerances in the anticipated filling level of the coffee in the chamber should be taken into account. The point is that if, due to fluctuation, too much coffee were contained in the chamber, the piston might get stuck against the coffee.

The object of the invention is to improve the known apparatus by providing a coffee maker which does not have the above-mentioned drawbacks.

To this end, according to the invention, the apparatus of the above-mentioned type is characterized in that a sensor is coupled to the driven shaft of the at least one motor, and that a control device is provided, an input of which receives a signal produced by the sensor, which control device controls the power input of the at least one motor in dependence on this signal.

In one embodiment, the signal produced by this sensor is indicative of the angular displacement of the motor shaft, and the control device is adapted to calculate the motor speed from the signal produced by the sensor and to control the power input of the motor such that the motor speed remains constant.

In a preferred embodiment, the control device is adapted to calculate, on the basis of the sensor-produced signal, the position of the part to be displaced, for instance the piston position. In this connection, it is preferred that the control device be adapted to reliably displace the part to be displaced to a well-defined reference position first, and to subsequently displace the part to be displaced from that reference position in the direction of the desired position. In this preferred embodiment, wherein the sensor-produced signal is indicative of the angular displacement of the motor shaft, this may take place in a simple manner when the sensor-produced signal is a pulse-shaped signal and the control device is adapted to count these pulses.

The control device may be arranged in a protected location within a housing of the coffee maker, and is only coupled to the motor, which need not be removed for normal maintenances.

The required detector may be relatively cheap.

Some coffee makers are already provided with a control device for performing specific tasks, such as properly carrying out selections with respect to operations in response to a selection indicated by a user (whether or not coffee, whether or not milk, whether or not sugar, much/little water, etc.). In such cases, this existing control device can be used through a suitable programming thereof, so that a saving can be made on parts.

From a change of the sensor-produced signal, the control device can derive the change of the counterforce experienced by the piston. In this connection, a radical increase of that counterforce may be interpreted as the piston contacting the coffee powder. The piston position at which this happens can be compared with a predetermined, expected value. A deviation can be interpreted as an error situation, such as too much/too little/no coffee in the chamber. On the other hand, it is possible to achieve that the piston is always brought closely against the coffee, independently of the exact filling condition of the chamber. The advantage thus achieved is that the amount of water left behind above the coffee is reduced to a minimum, as a result of which the coffee dregs, to be regarded as waste, are drier, causing less fouling.

Further aspects, characteristics and advantages of the present invention will be further explained hereinbelow by a description of a preferred embodiment with reference to the accompanying drawings. In these drawings:

FIG. 1 shows a schematic cross-section of a known apparatus;

FIGS. 2A–C show a schematic section of some essential parts of the apparatus shown in FIG. 1;

Figure 1:
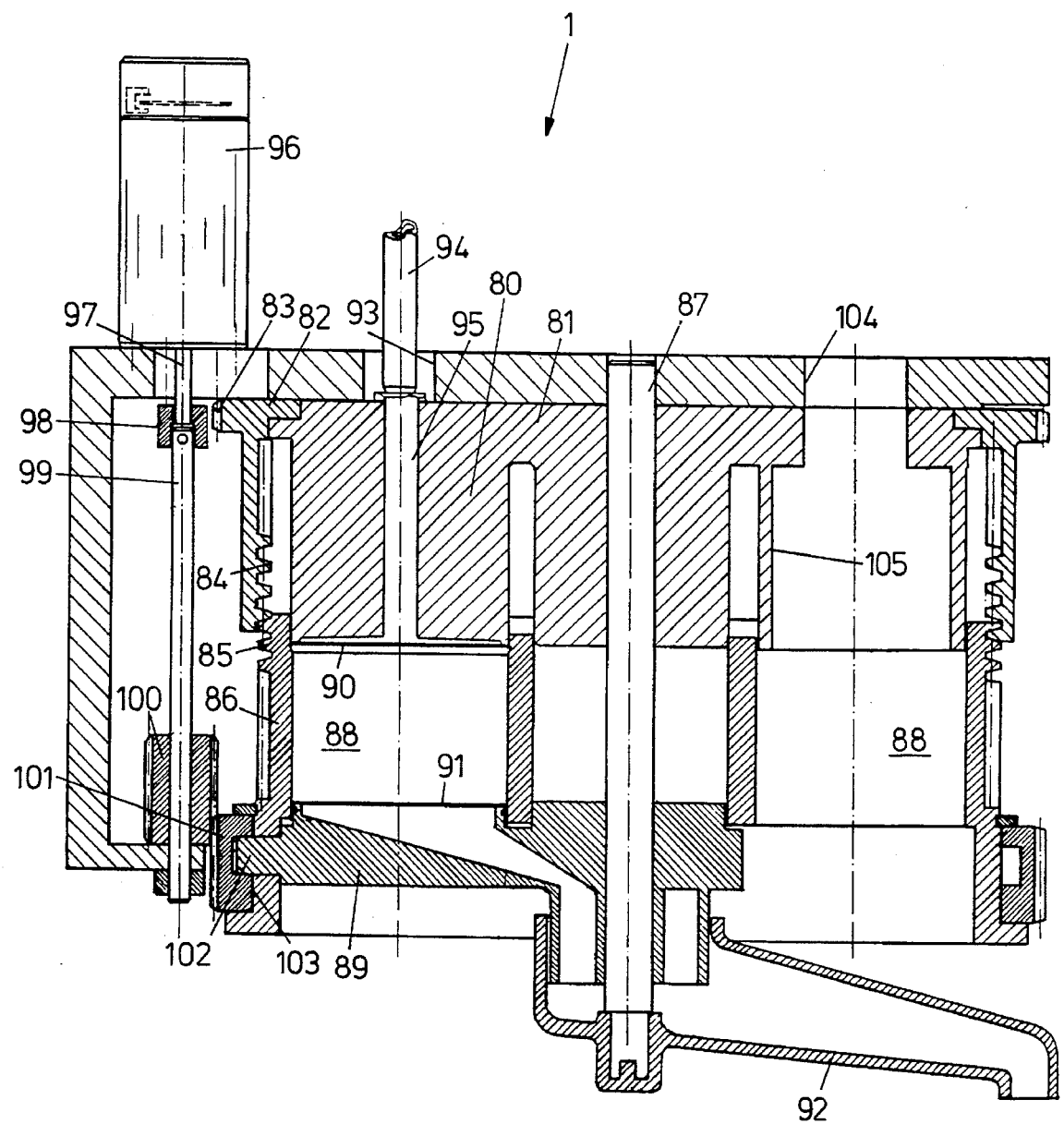

FIG. 1 shows an apparatus, generally designated by the reference numeral 1, for preparing a coffee beverage, which apparatus is disclosed in U.S. Pat. No. 5,083,503 (van Hattem et al.) and whose operation is described therein particularly, with reference to FIG. 7 thereof. Hence, for further details of this apparatus 1, it suffices to refer to this publication whose contents, through this reference, are considered to be included in the present application. For the sake of convenience, in FIG. 1 of the present application the same reference numerals have been used as in FIG. 7 of U.S. Pat. No. 5,083,503 (van Hattem et al.).

FIG. 2 schematically shows some essential parts of the apparatus 1 shown in FIG. 1, and the operation of the known apparatus 1 will presently be described, in so far as it is relevant within the scope of the present invention, with reference to FIGS. 1 and 2. Located within a cylinder 86 is at least one filling chamber 88. When the apparatus 1 has several filling chambers 88, the filling chambers 88 may have mutually different dimensions, as is the case in the apparatus discussed in U.S. Pat. No. 5,083,503 (van Hattem et al.) but within the scope of the present application, it is very well possible that two or more of the filling chambers 88 have mutually identical dimensions.

Near the lower portion of each filling chamber 88 a perforated plate 91 is located therein for providing thereon the flavor-imparting substance 2, in this case coffee powder, as indicated in FIG. 2. The perforated plate 91 is mounted on a cover 89 which may be sealingly connected, for instance by means of a sealing ring 3, to the bottom portion of the cylinder 86. The cover 89 contains a storage container 4, opening into a drain 5.

Further, the filling chamber 88 contains a piston 10 which, at the circumference thereof, sealingly connects to the inner wall of the cylinder 86, for instance by means of a sealing ring 11.

Although the contour of the cylinder 86 does not constitute a subject of the present invention, it is observed that this contour may be circular, but that the invention is not limited to such a construction.

The piston 10 has a water supply channel 95, opening into a distribution chamber 12. At the lower end of the piston 10, the distribution chamber 12 is bounded by a distributor plate 90 comprising a multiplicity of water passage openings 13.

The manner in which water is supplied to the water supply channel 95 does not constitute a subject of the present invention, and for a proper understanding of the present invention, knowledge thereof is not necessary for a skilled person, so that it will not be further described.

Figure 2A:
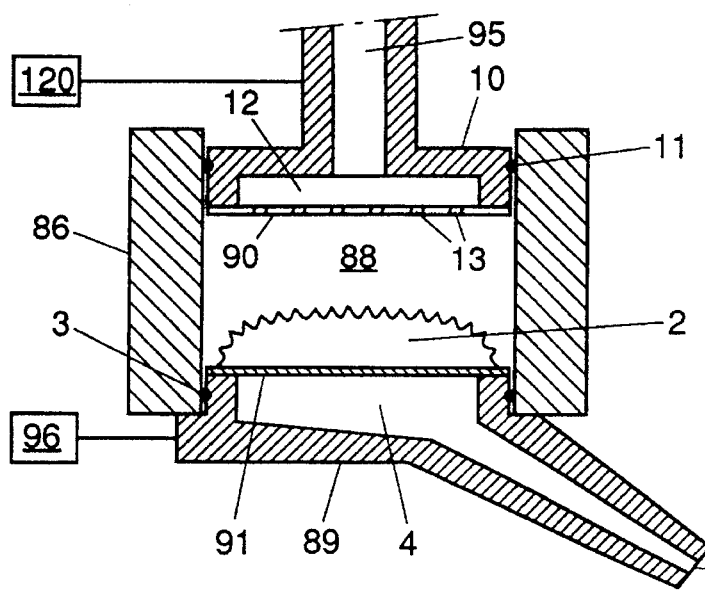
Figure 2B:
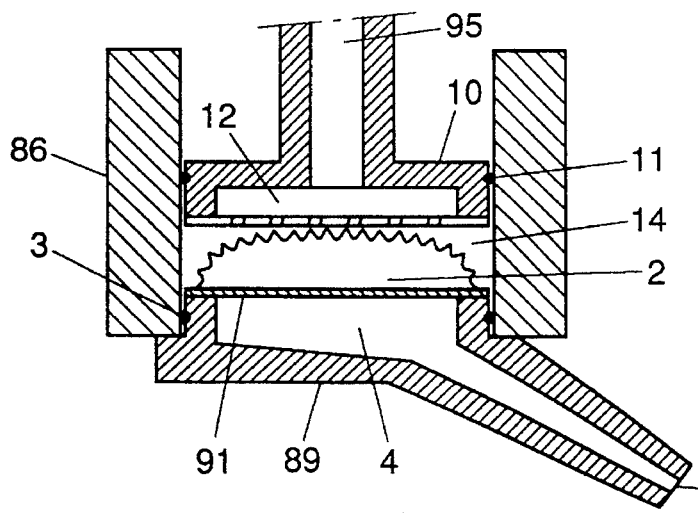

The piston 10 is axially displacable in the filling chamber 88. FIG. 2A shows the piston 10 in a position at the top of the filling chamber 88, and FIG. 2B shows the piston 10 in a position at the bottom of the filling chamber 88. It is observed that in the apparatus shown in FIG. 1 as disclosed in the above-mentioned U.S. Pat. No. 5,083,503 (van Hattem et al.), the piston 10 is in fact held stationary and the cylinder 86, together with the cover 89, is axially displaced. Within the scope of the present invention, it is not relevant whether the piston 10 or the cylinder 86 is moved; it is even possible that both are moved. It is only relevant that the piston 10 and the cylinder 86 are axially movable relative to each other, and in the discussion hereinbelow it will be understood that it is the piston 10 that moves and that the cylinder 86 is held stationary, but it is explicitly stated that the invention is not limited to this embodiment. Further, hereinafter, a displacement in the direction of the position shown in FIG. 2A to the position shown in FIG. 2B will be referred to as a downward movement of the piston 10, and a displacement in the opposite direction will be referred to as an upward movement of the piston 10. Finally, it is observed that the position shown in FIG. 2A is not the extreme position of the piston 10; the piston 10 may rise still further so as to be entirely removed from the filling chamber 88, after which the piston 10 strikes against a stop defining a reference position of the piston 10 relative to the filling chamber 88, which stop is not shown for the sake of simplicity.

For this vertical movement of the cylinder 86 relative to the piston 10, in FIG. 1 defined by the block 81, there is provided a housing ring 82 comprising an internal thread 84 engaging with an external thread 85 of the cylinder 86. Via teeth 83 and, if necessary, by means of a further gear reduction system, the housing ring 82 is coupled to a motor 120, not shown in FIG. 1 for simplicity's sake and indicated only schematically in FIG. 2.

For the tangential displacement of the cylinder 86, a second motor 96 is coupled to a pinion 100 cooperating with a gear 101 coupled to the cover 89. When the second motor 96 is energized in a condition wherein the piston 10 is withdrawn from the filling chamber 88, the cover 89 carries the cylinder 86 with it and the filling chamber 88 can be brought into communication, via filling gates 104, 105, with a supply device for coffee powder or the like, as shown on the right-hand side of FIG. 1.

When the second motor 96 is energized in a condition wherein the piston 10 is located within the filling chamber 88, the cylinder 86 is retained by the piston 10. Consequently, the cover 89 is forced to move relative to the cylinder 86, with a cam/cam slide guide construction, not further discussed at present, effecting that the cover 89 first lowers relative to the cylinder 86 in order to release the perforated plate 91 from the filling chamber 88, and is subsequently displaced tangentially relative to the cylinder 86. As a result, the coffee dregs left behind on the perforated plate 91 after the coffee-making process are removed. When the second motor 96 is energized in opposite direction, the perforated plate 91 is replaced in the filling chamber 88 again and pressed.

Figure 3:
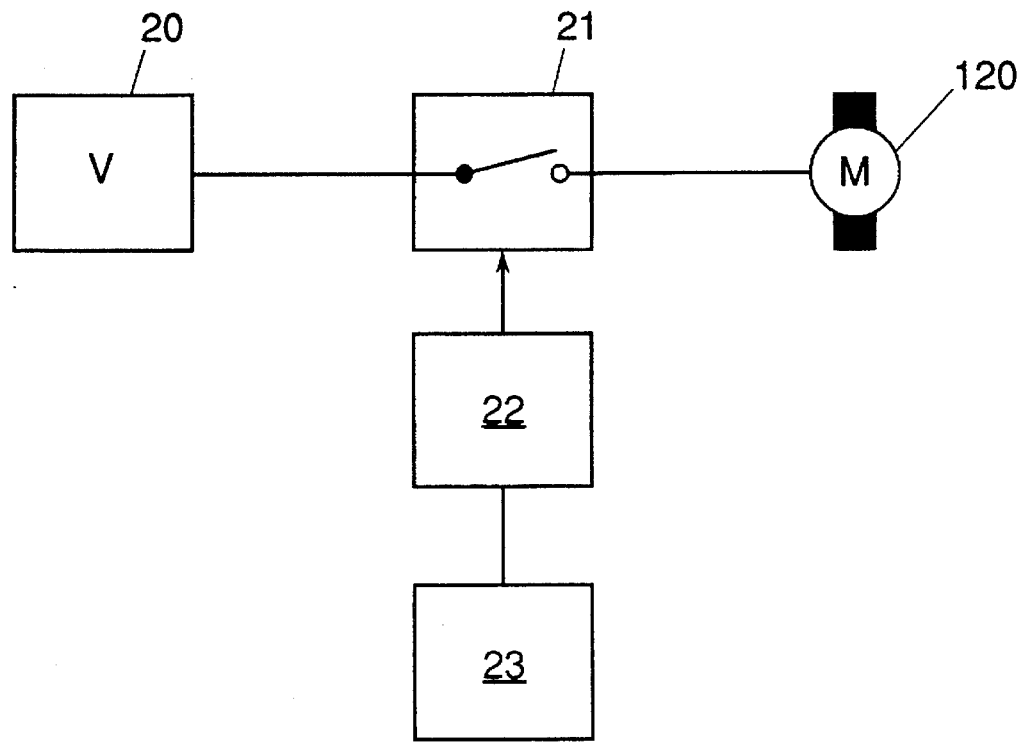
FIG. 3 is a schematic electric circuit diagram showing a conventional motor control.

In a conventional motor control a constant voltage (AC or DC) is supplied to the motor when the motor should rotate, and the voltage supply is interrupted when the motor should stop. FIG. 3 shows a schematic electric circuit diagram for realizing such conventional control of the motor 120. A voltage source 20, providing a constant voltage (AC or DC) at its output, is coupled via a switch 21 to the motor 120. The switch 21, for instance a relay, is controlled by a control device 22, receiving signals from a detector 23 for detecting the position of the piston 10 in the filling chamber 88, i.e. the axial position of the piston 10 relative to the cylinder 86. Normally, the switch 21 is open so that the motor 120 normally stands idle. At the moment when the piston 10 should lower in the filling chamber 88, the control device 22 operates the switch 21 for closing and, accordingly, energizing the motor 120. When the control device 22 detects, via the detector 23, that the piston 10 has reached a predetermined stop position, the control device 22 operates the switch 21 for opening again and, accordingly, for stopping the motor 120. The piston 10 is raised through energization of the motor 120 in opposite direction, for instance via a second switch, not shown.

Detection of the position of the piston 10 does not take place directly but by indirect routing. The detector 23 comprises a transducer, stationarily mounted on a frame of the coffee maker next to the housing ring 82. On the housing ring 82, at the level of the transducer, one or several detector elements are arranged at equal intervals along the circumference of the housing ring 82. For simplicity's sake, this transducer and detector elements are not illustrated separately, and form a conventional detector 23, for instance a Hall element and a plurality of magnets. When one of the detector elements is passed, the transducer supplies an indication signal to the control device 22, so that the control device 22 "knows" that the housing ring 82 has been rotated through an angle corresponding to the angular distance between the separate detector elements. The total angle of rotation can be calculated by the control device 22 by counting the number of indication signals from the detector 23. In accordance with a fixed relation defined by the thread 84, 85, this total angle of rotation corresponds to a linear displacement distance of the piston 10.

The momentary position of the piston 10 is calculated by the control device 22 by comparing this linear displacement distance each time with a reference position, for instance the extreme top position of the piston 10. At the beginning of an operation period, or even at the beginning of each coffee-making cycle, the piston 10 is moved to this extreme top position and, for instance, a counter in the control device 22 is reset.

As already mentioned hereinabove, this conventional control has a number of drawbacks. For instance, it is a drawback that elements of the detector 23 which is necessary for controlling the motor are mounted on parts which have to be removed regularly for a cleaning. Another drawback concerns the fact that the varying counterforces on the piston 10 cause a varying motor speed.

A further drawback concerns the fact that in the conventional control possible error situations are not taken into account. If, for whatever reason, no coffee is contained in the filling chamber 88, the coffee-making cycle is completed in a normal manner, and if too much coffee is contained in the filling chamber, or if the piston gets stuck in the cylinder 86 for any other reason, this is not noticed by the control device 22 and the coffee maker may be damaged.

Figure 4:
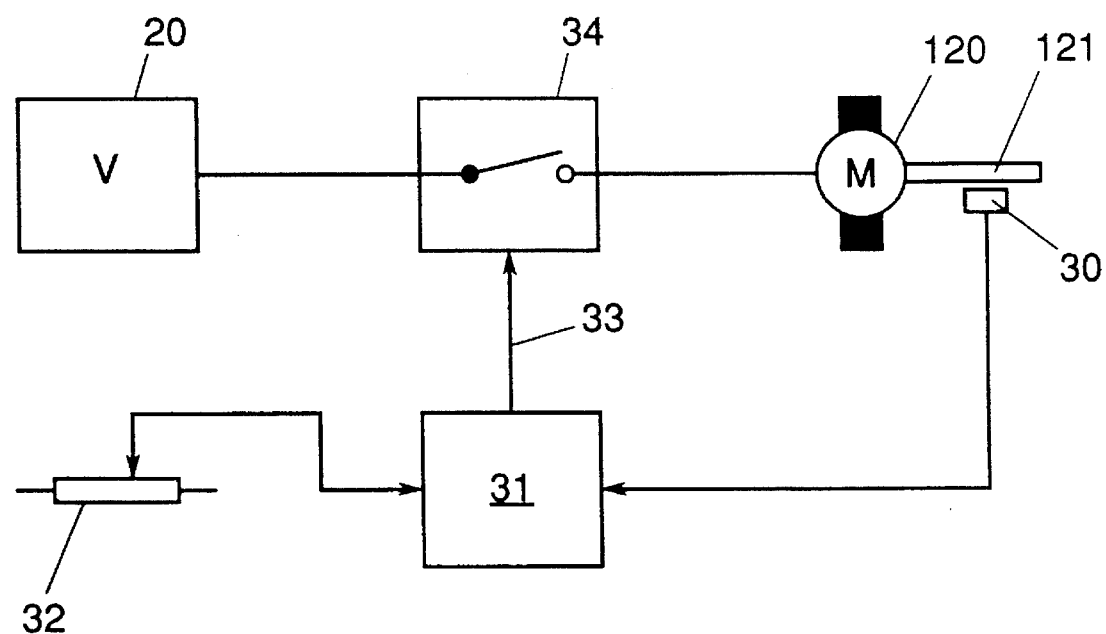
FIG. 4 is a schematic electric circuit diagram showing a motor control according to the present invention.

The coffee maker according to the present invention has a motor control which does not have these drawbacks. A schematic block diagram of this motor control is illustrated in FIG. 4 with regard to the motor 120. It is observed that within the scope of the invention it is sufficient when one of the two motors 96, 120 is provided with such motor control, while preferably both motors 96, 120 are provided with such motor control. The motor control for motor 96 is not illustrated separately, but is present in the preferred embodiment discussed hereinafter.

An essential aspect of the motor control according to the present invention is a detector 30, coupled to a driven shaft 121 of the motor 120 and adapted to detect revolutions, or parts of revolutions, of that driven shaft 121 and to produce an indication signal each time when the driven shaft 121 has made (such part of) a revolution. As an example of such a detector, a sector disc and an optocoupler cooperating therewith are mentioned here. This and other examples of detectors suitable for detecting a specific angular distance traversed by the driven shaft 121 of the motor are known in practice, and since their nature and construction do not constitute a subject of the present invention, and since for using the present invention any suitable detector of such detectors can further be applied, the detector 30 will now not be further described.

The indication signal from the detector 30 is received by a processor 31. The processor 31 is adapted to count the indication signals from the detector 30, referred to hereinafter as "pulses", and to calculate, on the basis of a fixed relation between the angular displacement of the driven motor shaft and the axial displacement of the piston 10, the axial displacement of the piston 10. The processor 31 may further be adapted to calculate the actual position of the piston 10 by comparing the calculated axial displacement of the piston 10 with a reference position, as already described hereinabove.

In this manner, the processor 31 has information with regard to the actual position of the piston 10 without requiring a detector connected to parts of the coffee maker which are to be cleaned. The detector 30 is coupled to the driven motor shaft 121 which need not generally be removed, at least not on a regular basis, in order to be cleaned. Moreover, the detector 30, coupled to the driven shaft 121 of the motor 120, provides a greater precision, in a relatively cheap manner, than the known detector, coupled to the cylinder 86. After all, due to the speed reduction applied, one revolution of the cylinder 86 corresponds to approximately five revolutions of the motor shaft 121, so that in an embodiment having a sector disc comprising twenty sector elements, a measuring accuracy of the displacement of the piston 10 is achieved which can otherwise only be achieved through the positioning of one hundred detector elements along the circumference of the housing ring 82.

In the preferred embodiment illustrated in FIG. 4, the processor 31 is also adapted to measure the return period and/or the frequency of the detector pulses, which is a measure for the rotational speed of the driven motor shaft and, accordingly, for the axial displacement speed of the piston 10. The processor 31 compares this measured speed with a predetermined value, which may have been provided as a setting value of a setting member 32 or as a value which is fixedly fed into a memory of the processor 31. On the basis of the outcome of this comparison, the processor 31 provides a control signal 33 to a regulating member 34 regulating the power supplied to the motor 120. The regulating member 34 may be adapted to regulate the magnitude (DC) or amplitude (AC) of a continuous feed (voltage or current) provided to the motor 120 from a voltage source 20, but preferably, the feed to the motor 120 is provided in the form of feed pulses, and the regulating member 34 is adapted to regulate the power supplied to the motor 120 from the voltage source 20 by means of pulse width modulation of the feed pulses mentioned.

The processor 31 is adapted to provide the control signal 33 to the regulating member 34 in such a manner that the regulating member 34 increases the power supplied to the motor 120 from the voltage source 20 when the processor 31 detects that the motor speed is less than the predetermined value, and that the regulating member 34 reduces the power supplied to the motor 120 form the voltage source 20 when the processor 31 detects that the motor speed is greater than the predetermined value. The effect thus achieved is that the motor speed is kept substantially constant over a wide range of load variations for the piston 10 and, accordingly, for the motor 120, so that the noise perceived by the user, as it is produced by the motor and the transmission members, is substantially constant.

Figure 5:
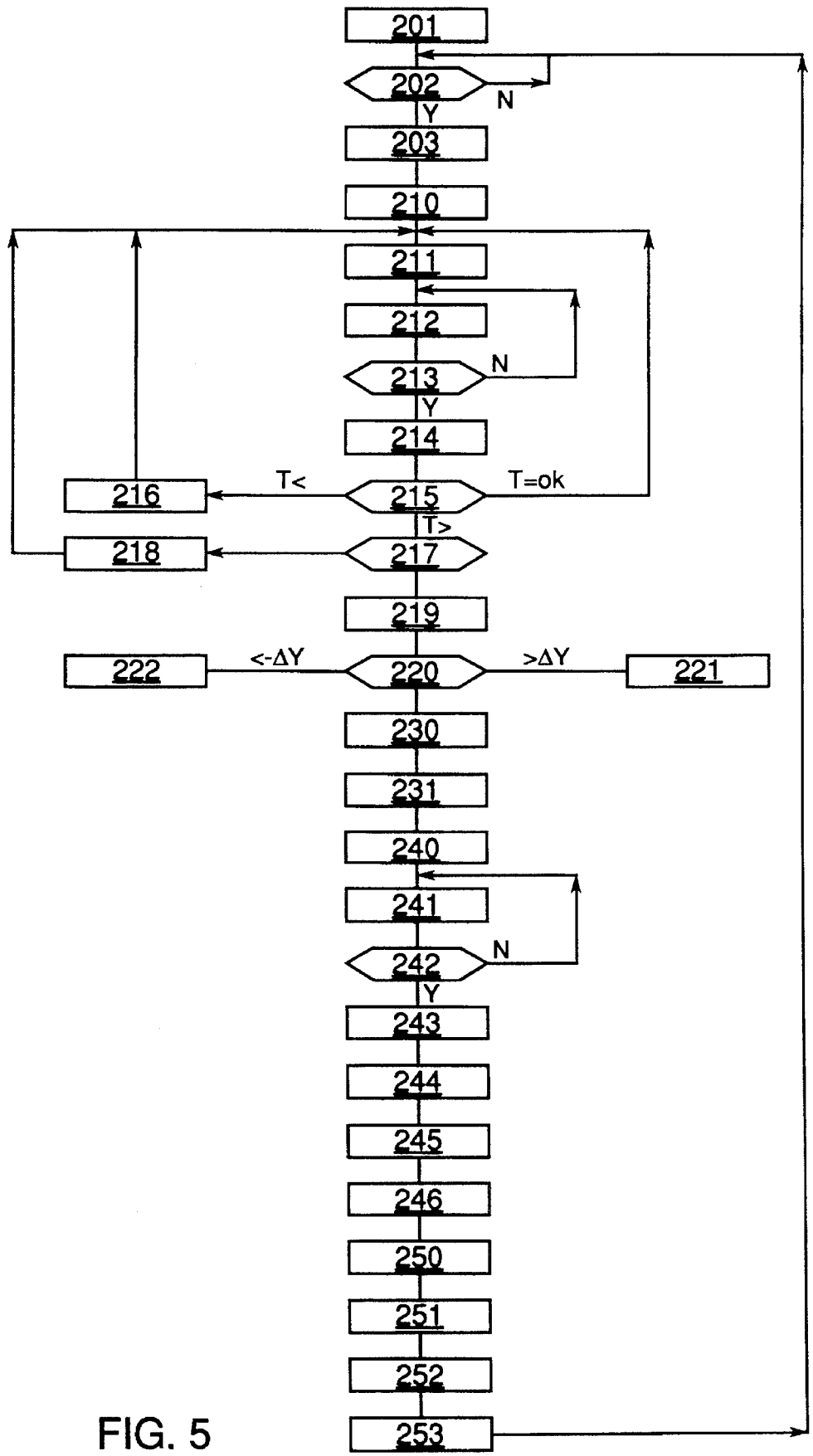
FIG. 5 is a flow diagram of process steps of a processor used in a preferred apparatus according to the invention.

Preferably, the processor 31 is adapted to establish possible error situations on the basis of the control signal 33, and, in response, influence the coffee-making process and/or generate an alarm signal, as will be explained hereinafter through a discussion of a coffee-making cycle of the apparatus 1 with reference to the flow diagram shown in FIG. 5. In this connection, it is understood that the processor 31 is shared by the first motor 120 and the second motor 96.

In a first step 201, the apparatus 1 is brought into a starting position. This first step 201 will be performed when the apparatus 1 is switched on, and each time when a reset command is given, for instance after the unwished-for occurrence of an error situation. If so desired, the processor 31 may be adapted to perform the first step 201 every each coffee-making cycle. In this step 201, the filling chamber 88 is closed at the bottom end thereof by the cover 89, the piston 10 is moved to its top extreme position, the reference position, and pulse counters X and Y, associated with the motors 96, 120, are reset. When the filling chamber 88 is closed by the cover 89, a varying counterforce occurs, but, in accordance with the invention, the rotational speed of the motor 96 remains constant, as described hereinabove. Preferably, the processor 31 is adapted to energize the motor 96 until the drive power required therefor has attained a predetermined value, ensuring a predetermined closing force of the cover 89.

In step 202, it is examined whether a selector panel of the apparatus 1 is being operated by a user. If not, step 202 is carried out once again. Hence, this step 202 represents a wait loop.

In step 203, the second motor 96 is energized to bring the filling chamber 88 into communication with a storage container for coffee powder. An amount of coffee powder 2 corresponding to the selection made via the selector panel is provided on the perforated plate 91 in the filling chamber 88. Subsequently, the second motor 96 is re-energized to position the filling chamber 88 under the piston 10.

In step 210, the downward displacement of the piston 10 is initiated through energization of the motor 120 at a first predetermined drive power. In step 211, a timekeeping is started by setting a counter T at zero, which counter is increased by one in step 212. In step 213, it is examined whether a pulse given by the detector 30 is received. If not, step 212 is returned to.

If it is detected in step 213 that a detector pulse is received, the contents of the counter Y associated with the motor 120 are increased by one in step 214. In step 215, the contents of the counter T are compared with the predetermined contents of a time reference memory. If the contents of the counter T correspond to those of the time reference memory, the momentary rotational speed of the motor shaft 121 is equal to the desired rotational speed, and step 211 is returned to.

If it is detected in step 215 that the contents of the counter T are smaller than those of the time reference memory, the momentary rotational speed of the motor shaft 121 is higher than the desired rotational speed, and in step 216, a command to reduce the power supplied to the motor 120 is given to the regulating member 34, whereupon step 211 is returned to.

If it is detected in step 215 that the contents of the counter T are higher than those of the time reference memory, the momentary rotational speed of the motor shaft 121 is lower than the desired rotational speed. In that case, in step 217, the power momentarily supplied to the motor 120 is compared with a value stored in a first motor power reference memory. When the power momentarily supplied to the motor 120 is less than the value stored in the first motor power reference memory, in step 218, a command to increase the power supplied to the motor 120 is given to the regulating member 34, whereupon step 211 is returned to.

If it is detected in step 217 that the power momentarily supplied to the motor 120 is equal to or greater than the value stored in the first motor power reference memory, the piston 10 apparently strikes against something and the displacement thereof should be stopped. Therefore, in step 219 a command to stop the motor 120 is given to the regulating member 34.

Now, the contents of the counter Y associated with the motor 120 are representative of the position of the piston 10 within the filling chamber 88. In step 220, the contents of this counter Y are compared with the contents of a memory location representative of the target position of the piston 10 as corresponding to the height of the amount of coffee powder 2 dosed on the perforated plate 91, which amount corresponds to the selection made via the selector panel.

If it is detected in step 220 that the contents of the counter Y are greater than the contents of the target position memory location by more than a predetermined degree ΔY, too little coffee powder or no coffee powder at all is present in the filling chamber 88. Such a situation might for instance occur when a storage reservoir for the coffee powder is empty, or when a supply line for the coffee powder is clogged. The processor 31 is preferably adapted such that in that event the coffee-making process is broken off and, in step 221, an error message is generated, such as for instance lighting a lamp behind a display bearing the inscription "coffee empty".

If it is detected in step 220 that the contents of the counter Y are less than the contents of the target position memory location by more than a predetermined degree –ΔY, too much coffee powder 2 is present in the filling chamber 88, or an obstruction is present in the filling chamber 88. The processor 31 is preferably adapted such that in that event the coffee-making process is broken off and, in step 222, an error message is generated.

If it is detected in step 220 that the contents of the counter Y substantially correspond to the contents of the target position memory location, a correct amount of coffee powder 2 is present in the filling chamber 88, and the perforated plate 90 is located in the vicinity of the top side of the coffee powder 2 (FIG. 2B).

Conventional coffee makers are troubled with the problem that when the piston 10 is positioned near the coffee powder, a certain margin of safety should be observed. As a consequence, in addition to the coffee powder 2, a certain space 14, filled with water, is present below the piston 10 during the coffee-making process. In itself, this is no problem for the actual coffee-making process, but when the desired amount of coffee beverage has been made and the water supply has stopped, this space 14 remains filled with water. As a consequence, the coffee dregs 2 which are left after the coffee-making process are relatively moist, which presents a problem during the removal of the coffee dregs 2 from the filling space 88 to prepare the apparatus for a next coffee-making cycle.

In the above-described motor control according to the invention, this problem has been reduced, because the distributor plate 90 of the piston 10 can reliably be positioned more accurately near the coffee powder, so that the space 14 can be reduced.

Figure 2C:
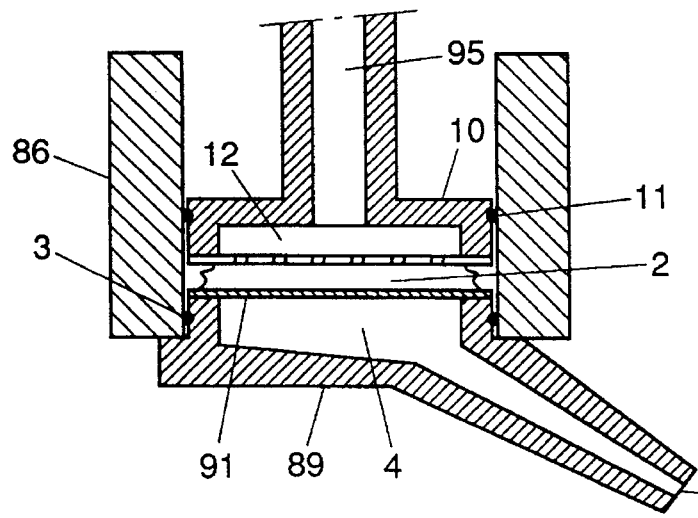

Further, in a preferred embodiment, the processor 31 may be designed such that after the detection in step 220 that the piston 10 has reached the coffee powder 2, in step 230 the motor 120 is controlled with a motor power which has been increased to a second predetermined value. In a few words, the effect thus achieved is that the piston 10 presses the coffee powder 2 with a predetermined pressing force. As a result, differences in level in the coffee powder 2 are largely eliminated, so that the space 14 is further reduced, as illustrated in FIG. 2C.

As a matter of fact, already in step 217, the value stored in the motor power reference memory may be chosen such that in step 219 the motor 120 is only stopped when the piston 10 is pressed with the second predetermined motor power. In that case, step 230 can be omitted.

In particular cases it may be undesired that during the actual coffee-making process, the coffee powder 2 is under pressure of the piston 10. In such cases, the processor 31 is adapted to energize, in step 231, the motor 120 in opposite direction and to raise the piston 10 over a predetermined distance, i.e. a predetermined number of detector pulses.

In step 240, the actual coffee-making process is started through the offering of water pressure to the water supply channel 95, which opens into the distribution chamber 12 of the piston 10. Also, a wait sequence is started by writing a predetermined value in a wait memory W. The water fills the distribution chamber 12 and is forced, under the influence of the supply pressure in the supply channel 95, to move toward the coffee powder 2 via the water passage openings 13 in the distributor plate 90, the water being evenly distributed over the coffee powder 2 by the distribution chamber 12 and the water passage openings 13 in the distributor plate 90. The water will move through the coffee powder 2, and via the perforated plate 91 it will be received in the storage container 4 in the cover 89. Via the drain 5, the water, which may then be referred to as coffee beverage, is conducted to a receptacle such as a coffee cup or a coffeepot.

In step 241, the contents of the wait memory W is reduced by one. In step 242, it is examined whether the contents of the wait memory W have become equal to (or less than) zero; if not, step 241 is returned to.

When it is detected in step 242 that the contents of the wait memory W have become equal to zero, a period has passed which is determined by the value written in the wait memory W in step 241, which period is preferably approximately 15 seconds. In response thereto, in step 243 the water pressure to the water supply channel 95 is removed.

This terminates the actual coffee-making process. As described hereinabove, a certain amount of water is now left behind in the space 14 and in the spent coffee powder. Preferably, the processor 31 is designed such that after the water supply has been stopped in step 243, in step 244 power of a third predetermined value is again supplied to the motor 120, which third predetermined value may be equal to the second predetermined value. In a few words, the effect thus achieved is that the piston 10 squeezes out the coffee dregs 2, so that at least a portion of the water left behind in the coffee dregs 2 and the space 14 is discharged via the drain 5. As a result, the coffee dregs 2 to be discharged are relatively dry, while also a certain saving in the water consumption can be realized.

In step 245, a wait sequence is carried out, comparable with steps 240– 242.

In step 246, the motor is energized in opposite direction in order to lift the piston 10 slightly so as to remove the pressure from the coffee dregs 2.

In step 250, the second motor 96 is energized to detach the cover 89 from the cylinder 86 and subsequently rotate it relative to the cylinder 86 to allow removal of the coffee dregs 2 from the perforated plate 91, as described hereinabove. For this purpose, in step 251, the motor 120 is energized to lower the piston 10 in order to press the coffee dregs 2 outward, whereupon the motor 120 is energized in opposite direction to raise the piston 10 again.

In step 252, the second motor 96 is energized in opposite direction to secure the cover 89 on the cylinder 86 again.

In step 253 the first motor 120 is energized to move the piston 10 upward toward the extreme position serving as a reference. This may take place relatively quickly at first, utilizing the detector pulses for counting back the memory Y, while, when the memory Y has been counted back almost to zero, the rotational speed of the motor 120 is reduced to prevent the piston 10 from striking the stop, which determines the reference position, with a blow.

Finally, step 202 is returned to, so that the apparatus 1 is ready again to repeat the above-described cycle.

It will be readily understood by a skilled person that the embodiment shown of the apparatus according to the invention can be changed or modified without departing from the inventive concept or the protective scope. For instance, it is possible to design the processor 31 and the regulating member 34 as an integrated unit.

Further, it is possible to carry out a volume dosage of the water instead of or combined with the time dosage described in steps 240–243. This involves the use of a water-quantity meter included in the water supply channel 95 or in a supply line to that water supply channel 95, which water-quantity meter produces a measuring pulse when a predetermined quantity of water has passed. For simplicity's sake, such a water-quantity meter, which may be based on the counting of revolutions of a blade wheel disposed in the water stream, is not shown in the Figures. In the case where volume dosage is used, the measuring pulses produced by the water-quantity meter are counted and the water supply is stopped as soon as a predetermined number of measuring pulses have been counted. In this manner, the value to be written in the wait memory W may be equal to the above-mentioned predetermined number of measuring pulses, and in step 241, the contents of the wait memory W can be reduced by one in response to the reception of a measuring pulse produced by the water-quantity meter.

We claim:

1. An apparatus for preparing a beverage, comprising:

at least one chamber receiving a flavor-imparting substance;

an apparatus part displaceable relative to said at least one chamber;

an electromotor receiving input power and having a driven shaft coupled to said apparatus part, said driven shaft displaces said apparatus part relative to said at least one chamber;

means for detecting a position of said apparatus part relative to said at least one chamber;

a sensor coupled to said driven shaft; and, a control device having a signal input receiving a signal produced by said sensor, wherein said control device controls the power input of said electromotor in dependence on said sensor signal.

2. An apparatus according to claim 1, wherein said apparatus part is a piston which is axially displaceable relative to said at least one chamber, and wherein said control device calculates the position of said piston relative to said at least one chamber based on said sensor signal.

3. An apparatus according to claim 2, characterized in that the control device is adapted to control the motor in a first step for displacing the piston toward a reference position, to reset a counter in a second step and, in a third step, to displace the piston from said reference position in the direction of an operating position while increasing the counter position on the basis of the signal produced by said sensor.

4. An apparatus according to claim 2, characterized in that the control device is adapted to interrupt the displacement of the piston toward the operating position when the motor power required therefor exceeds a predetermined value.

5. An apparatus according to claim 4, characterized in that the control device is adapted to compare the piston position reached with the desired operating position, and to generate an alarm signal when the piston position reached differs from the desired operating position by more than a predetermined degree.

6. An apparatus according to claim 4, characterized in that the control device is adapted to increase the motor power relatively briefly toward a second predetermined value when the piston displacement ends.

7. An apparatus according to claim 4, characterized in that the control device is adapted to supply power to the motor once again, having a third predetermined value, when the coffee-making process ends, so as to squeeze out the coffee dregs.

8. An apparatus according to claim 1, characterized in that the control device is adapted to control the power input of the motor by means of pulse width modulation of feed pulses supplied to the motor.

9. An apparatus according to claim 1, characterized in that the control device is adapted to derive from the signal produced by said sensor a signal indicative of the rotational speed of the motor, and to control the power input of the motor such that the motor speed is kept substantially constant.

* * * * *